(12) United States Patent
Lyvers (10) Patent No.: US 7,228,612 B2
(45) Date of Patent: Jun. 12, 2007

(54) METHODS OF MAKING REFRIGERATOR STORAGE ASSEMBLIES

(75) Inventor: Daniel Lyvers, Cordova, TN (US)

(73) Assignee: Viking Range Corporation, Greenwood, MS (US)

( * ) Notice: Subject to any disclaimer, the term of this patent is extended or adjusted under 35 U.S.C. 154(b) by 427 days.

(21) Appl. No.: 10/806,979

(22) Filed: Mar. 23, 2004

(65) Prior Publication Data

US 2005/0210655 A1  Sep. 29, 2005

(51) Int. Cl.
- *B22D 11/126* (2006.01)
- *B23P 17/00* (2006.01)
- *A47B 96/04* (2006.01)

(52) U.S. Cl. ............... 29/527.1; 29/527.6; 264/177.1; 264/177.13; 264/177.17; 264/211.12; 264/239; 312/404; 312/406; 312/406.2; 312/408

(58) Field of Classification Search ............... 29/527.1, 29/527.2, 527.4, 527.6, 557; 264/176.1, 264/177.1, 177.13, 177.16, 177.17, 211.12, 264/129, 239, 148; 312/401, 402, 404, 406, 312/406.2, 408; 62/377
See application file for complete search history.

(56) References Cited

U.S. PATENT DOCUMENTS

| | | | | |
|---|---|---|---|---|
| 2,253,971 | A | * 8/1941 | Dodge | 312/404 |
| 2,528,807 | A | 11/1950 | Whitney | |
| 3,375,936 | A | 4/1968 | Kessler | |
| 3,476,852 | A | * 11/1969 | Shattuck | 264/261 |
| 3,478,138 | A | * 11/1969 | Friesner | 264/145 |
| 3,937,537 | A | 2/1976 | Dietterich | 312/204 |
| 4,960,308 | A | * 10/1990 | Donaghy | 312/404 |
| 5,040,856 | A | * 8/1991 | Wilkins et al. | 312/402 |
| 5,044,704 | A | * 9/1991 | Bussan et al. | 312/402 |
| 5,048,247 | A | * 9/1991 | Weldy | 52/255 |
| 5,212,962 | A | * 5/1993 | Kang et al. | 62/382 |
| RE34,377 | E | 9/1993 | Wilkins et al. | |
| 5,322,213 | A | * 6/1994 | Carter et al. | 229/166 |
| 5,346,299 | A | * 9/1994 | Werkmeister et al. | 312/405.1 |
| D358,403 | S | * 5/1995 | Edman et al. | D15/89 |
| 5,437,503 | A | * 8/1995 | Baker et al. | 312/404 |
| 5,494,630 | A | * 2/1996 | Eraybar et al. | 264/138 |
| D384,681 | S | * 10/1997 | Martin | D15/89 |
| 5,730,516 | A | * 3/1998 | Vismara | 312/406 |
| 5,890,785 | A | * 4/1999 | Vismara | 312/406 |
| 5,918,959 | A | * 7/1999 | Lee | 312/404 |
| 5,947,573 | A | * 9/1999 | Tovar et al. | 312/404 |

(Continued)

FOREIGN PATENT DOCUMENTS

JP    06174363 A  *  6/1994

*Primary Examiner*—Essama Omgba
(74) *Attorney, Agent, or Firm*—Womble Carlyle Sandridge & Rice, PLLC (57) ABSTRACT

A method of making a removable refrigerator storage assembly is provided. The method includes feeding a polymeric or metal material into an extruder and directing the material through a die having an aperture with a first and second leg formed therein, thereby forming an intermediate shelf extrusion. The intermediate shelf extrusion is cut into a predetermined length to form the shelf extrusion having a bottom wall integrally formed with a side wall. The shelf extrusion is painted or plated to a specific finish. The method also encompasses attaching to both ends of the shelf extrusion end walls having brackets formed thereon for removably engaging supports formed on the door of a refrigerator.

13 Claims, 7 Drawing Sheets

U.S. PATENT DOCUMENTS

| | | | |
|---|---|---|---|
| 5,951,134 A * | 9/1999 | Braun et al. | 312/405.1 |
| 6,119,308 A * | 9/2000 | Owen | 16/87 R |
| 6,153,131 A * | 11/2000 | Huang et al. | 264/40.1 |
| 6,565,169 B1 * | 5/2003 | Moreno-Olguin et al. | 312/404 |
| 2004/0000120 A1 * | 1/2004 | Fagan et al. | 52/784.1 |
| 2004/0174107 A1 * | 9/2004 | O'Halloran | 312/404 |
| 2005/0156494 A1 * | 7/2005 | Bergmann et al. | 312/404 |
| 2005/0210655 A1 * | 9/2005 | Lyvers | 29/527.1 |
| 2006/0082270 A1 * | 4/2006 | Collins et al. | 312/405.1 |
| 2006/0186774 A1 * | 8/2006 | Bassi | 312/404 |

* cited by examiner

FIG. 7

METHODS OF MAKING REFRIGERATOR STORAGE ASSEMBLIES

TECHNICAL FIELD

The present invention generally relates to methods of forming storage assemblies and, more particularly, to methods of making adjustable storage assemblies for refrigerators.

BACKGROUND

Over the years, household refrigerators have evolved to accommodate ever increasing functional demands by users. In addition to preserving food, refrigerators must be functionally versatile, easy to maintain and reasonably priced. Consumers desire refrigerators with adjustable storage compartments that can accommodate a variety of food and that are easily accessible to facilitate cleaning and maintenance. As a result, various manufacturers have offered refrigerators with removable shelves and storage assemblies.

Presently, refrigerators usually include various sized storage assemblies that are formed of injection molded polymeric components. In order to produce these various-sized storage assemblies, however, a manufacturer must construct a separate mold for each size of component. These molds can be expensive, add to the cost of the final product and lengthen the time needed to bring a new product to market.

SUMMARY

The present invention is directed to a method of making storage assemblies for refrigerators. The method includes feeding a material to an extruder and extruding the material through a die to form an intermediate extrusion. The intermediate extrusion is cut to a predetermined length to form a shelf extrusion and coated to form a specific finish. An end wall having a bracket for engaging a support in a refrigerator is attached to each end of the shelf extrusion to complete the refrigerator storage assembly. By this method, storage assemblies of varying lengths can be produced from the same equipment, thereby eliminating the need for a separate mold for each sized storage assembly.

In a first embodiment, the method of making a refrigerator storage assembly includes feeding to an extruder a material selected from a metal or a polymeric composition, and extruding the material through a die of the extruder to form a first intermediate extrusion. The die includes an aperture defining a first leg and a second leg. The method also includes cutting the first intermediate extrusion to a predetermined length to form a first shelf extrusion having a bottom wall integrally formed with a side wall. The first shelf extrusion can be coated to form a specific finish. Once complete, the first shelf extrusion can be attached to a first pair of end walls of the first shelf extrusion. Each of the first pair of end walls engages both the bottom wall and the side wall of the first shelf extrusion. The end walls each include a distal face having a bracket for engaging a support disposed in a refrigerator. The method also can include aligning a wall section in a channel formed in the side wall of the shelf extrusion, and aligning a cap over the wall section.

In a second embodiment, the method includes feeding a material to an extruder, extruding the material through a die of the extruder to form a first intermediate extrusion, cutting the first intermediate extrusion to a first predetermined length to form a first shelf extrusion and coating the first extrusion. This method also includes injection molding a first pair of end walls, each having a bracket formed on a distal face for engaging a support in a refrigerator, and then attaching the first pair of end walls to the ends of the first shelf extrusion. A second intermediate extrusion is formed by extruding the material through the die, cutting the second intermediate extrusion to a second different predetermined length coating the second extrusion to form a second shelf extrusion. A second pair of end walls, also including a bracket for engaging a support in a refrigerator, are attached to the ends of the second shelf extrusion. The end walls can be attached to the shelf extrusions using fasteners or adhesives, such as screws, pins or glue. The materials from which the extrusions are formed are selected from metals or polymeric materials.

In a third embodiment, the method includes feeding to an extruder a material selected from a metal or a polymeric composition, and extruding the material through a die of the extruder to form a first intermediate extrusion. In this embodiment, the die includes an aperture defining a first leg and a second leg. The method also includes cutting the first intermediate extrusion to a predetermined length to form a first shelf extrusion having a first bottom wall integrally formed with a first side wall, coating the first shelf extrusion to a specific finish and injection molding a first and a second pair of end walls. The first pair of end walls is attached to the ends of the first shelf extrusion. Each of the first and second pairs of end walls includes a distal face having a bracket for engaging a support, such as a channel guide, disposed in the refrigerator. Each of the first pair of end walls engages both the first bottom wall and the first side wall of the first shelf extrusion. This method also includes forming a second intermediate extrusion by extruding the material through the die, cutting the second intermediate extrusion to a second predetermined length to form a second shelf extrusion and coating the second shelf extrusion to a specific finish. The first predetermined length is unequal to the second predetermined length, and the second shelf extrusion has a second bottom wall integrally formed with a second side wall. The second pair of end walls are attached to the ends of the second shelf extrusion, and each of the second pair of end walls also engages the second bottom wall and the second side wall of the second shelf extrusion.

These and other aspects of the present invention are set forth in greater detail below and in the drawings which are briefly described as follows.

DETAILED DESCRIPTION

The present invention is directed to methods of forming storage assemblies for refrigerators, such as shelves, drawers or bins. The methods generally include extruding a material through a die to form an intermediate extrusion that is cut to a predetermined length to form a shelf extrusion and coating the extrusion to a specific finish. The shelf extrusion forms the portion of the storage assembly upon which refrigerator contents are placed. Using such shelf extrusions in refrigerator storage assemblies allows for storage assemblies of various lengths to be produced using the same equipment, and avoids the necessity of obtaining a separate tooling mold for each sized assembly, as would be required if the molded components were used instead. The storage assemblies formed by the methods of the present invention, however, can be substantially indistinguishable from assemblies that are constructed from molded parts. The term "shelf extrusion" refers to an extruded structure with a generally uniform cross-section along its entire length and which includes at least a generally planar component that, when disposed within a refrigerator, supports items resting thereon. Although the cross-section of the shelf extrusion of the present invention is generally uniform along its entire length, the term can encompass an extruded structure having one or more features, such as notches, holes, slots and tabs that are formed by cutting away or removing a portion of material from the extruded structure. Also, while the component which supports items is generally planar, the term "shelf extrusion" can encompass components having one or more ridges, channels or similar features that constitute one or more support surfaces aligned within a plane to support the items.

Figure 1:
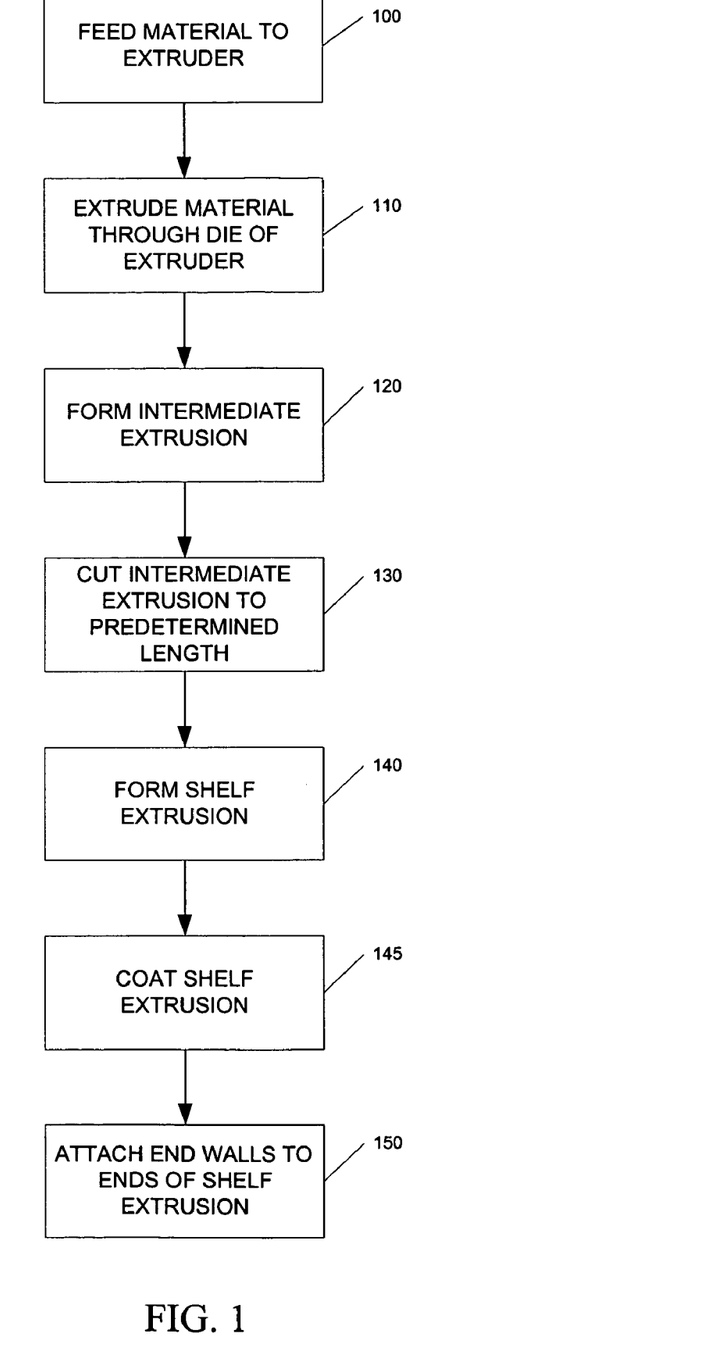
FIG. 1 is a diagram of a method of forming a refrigerator storage assembly according to the present invention.
Figure 2:
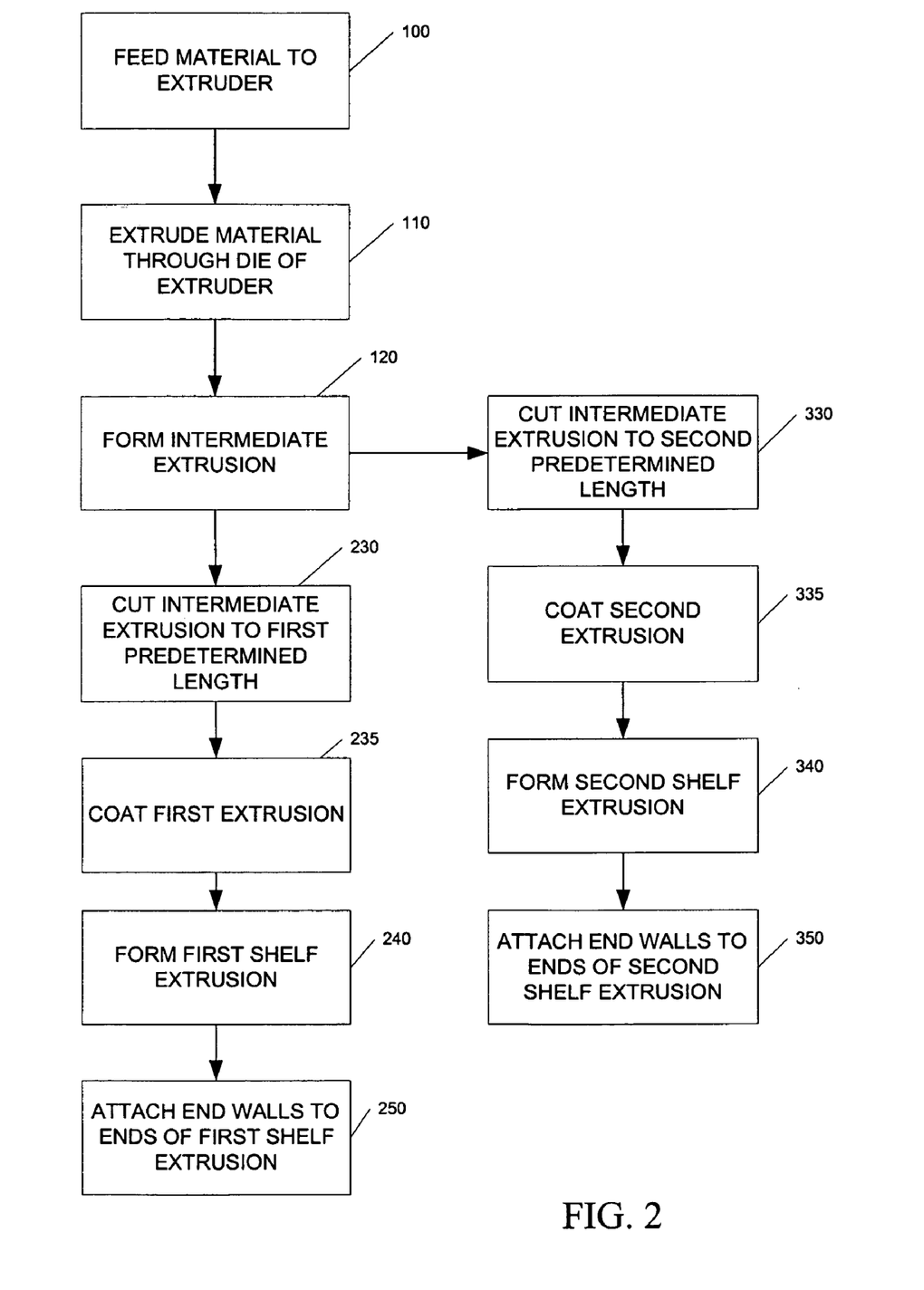
FIG. 2 is a diagram of a second method of forming a refrigerator storage assembly according to the present invention.
Figure 3:
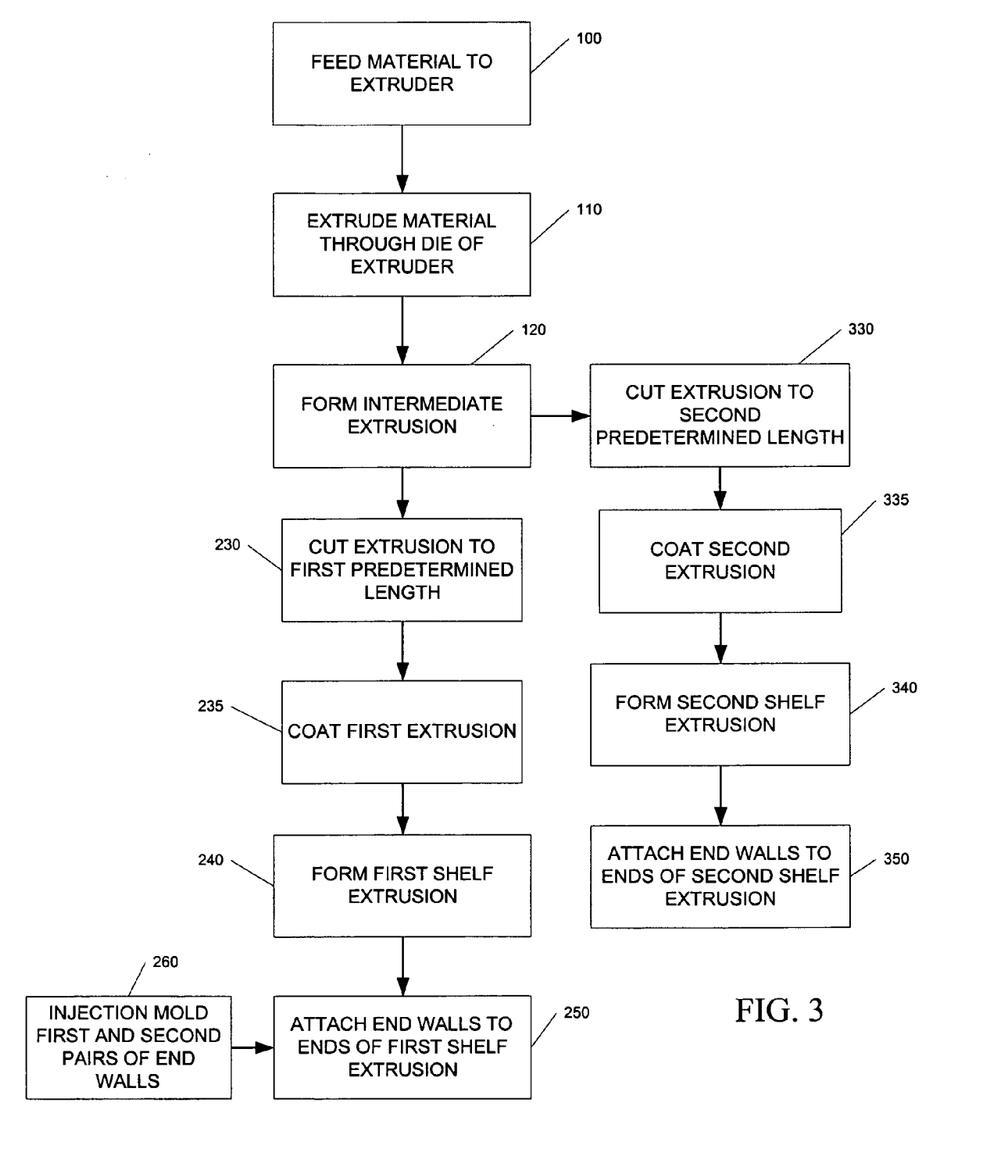
FIG. 3 is a diagram of a third method of forming a refrigerator storage assembly according to the present invention.

Referring to the Figures, wherein like numbers refer to like parts throughout the several views, FIGS. 1-3 show various methods of forming refrigerator storage assemblies encompassed by the present invention. FIG. 1 shows a process for forming a refrigerator storage assembly that begins with feeding material to an extruder in step 100. The material preferably is from a polymeric or metal material suitable for forming durable components. The polymeric materials can be selected from polyvinyl chlorides, polycarbonates, polyesters, chlorinated polyethylenes, acrylics, polystyrenes, acrylonitrite-butadiene-styrene copolymers, nylons and any combinations or variations thereof. Additionally, metals, such as aluminum, copper or steel can be used in the method. The polymeric or metal material can be fed to the extruder in solid form, typically pellets, chips or billets.

The polymeric extruder includes a feed hopper connected to a barrel in which one or two conveyor screws are disposed. The screw(s) are rotated to carry the material toward a die. The material can be in a softened state by heat from the shear action of the screw(s) and/or by heat supplied to the barrel. The screw then forces or extrudes the material through the die in step 110. Extruding metal material includes placing a billet into equipment that heats the billet to a prescribed temperature. The heated metal then is pushed by a ram through the die. The opening in or formed by the die can have a variety of cross-sections depending upon the desired structure of the shelf extrusion to be formed. For example, the opening can have a cross-section shown in FIG. 7. In this case, the opening has a first leg corresponding to the bottom wall 22 of the shelf extrusion 20, and a second leg corresponding to the side wall 24.

The material solidifies and cools as it exits the die to form an intermediate extrusion in step 120. The intermediate extrusion has the desired cross-section, such as that shown in FIG. 7, or any other suitable cross-section, but also has an indeterminate length. The intermediate extrusion then is cut to a predetermined length in step 130. In one embodiment, simply cutting the intermediate extrusion to the predetermined length forms a shelf extrusion as step 140. In alternative embodiments, however, the step of forming the shelf extrusion 140 also can include bending, stamping, embossing, drilling, cutting, notching and other process steps, either singly or in combination, to form apertures, notches, tabs, grooves, channels, and other substructures within the extrusion. The shelf extrusion can be run through a coating process to form a specific finish. The coating of step 145 can occur before the intermediate extrusion is cut to a predetermined length in step 130, or after the intermediate extrusion is cut but before the shelf extrusion is finally formed, or after the shelf extrusion is formed in step 140. The coating step 145 can include painting the extrusion with a powder coating, or plating a material thereon to form a specific finish.

The method also includes in step 150 attaching one or more end walls to the end(s) of the shelf extrusion. This step can include interlocking tabs, ribs, notches or other structures formed on the end walls and/or shelf extrusion, frictionally engaging the end walls to the shelf extrusion, or connecting them together with one or more fasteners, such as clips, screws, pins, adhesives or the like.

As shown in FIGS. 2 and 3, the methods of the present invention encompasses forming two or more shelf extrusions of varying length with the same extruder and die. As with the process set forth in FIG. 1, the method set forth in FIG. 2 includes in step 100, feeding material to an extruder, extruding the material in step 110 through the die of the extruder, forming in step 120 an intermediate extrusion. This method, however, includes cutting the intermediate extrusion to a first predetermined length in step 230, and cutting an intermediate extrusion to a second predetermined length in step 330. The first predetermined length is not equal to the second predetermined length.

The method shown in FIG. 2 also includes the step 235 in which the first extrusion is coated to form a specified finish. Likewise, the second extrusion is coated to form a specified finish in step 335. As with the method shown in FIG. 1, the steps 235 and 335 can occur before the intermediate extrusions are cut to predetermined lengths, after cutting but before formation of the shelf extrusion, or after the shelf extrusions are formed in steps 240 and 340. Additionally, steps 235 and 335 need not occur at the same point within the two different sequences of forming the first and second shelf extrusions. The first shelf extrusion is formed in step 240 from the portion of the intermediate extrusion cut to a first predetermined length, and the second shelf extrusion is formed in step 340 from the portion of the intermediate extrusion cut to the second predetermined length. As with the method of FIG. 1, steps 240 and 340 can include a variety of intermediate steps.

Other steps include attaching in step 250 a first pair of end walls to the ends of the first shelf extrusion, and attaching in step 255 a second pair of end walls to the second shelf extrusion. The steps of attaching first and second pairs of end walls to the ends of the first and second shelf extrusions can include a variety of different processes as set forth above. These intermediate steps of forming and attachment can, but need not, be the same for the first and second shelf extrusions.

As shown in FIG. 3, the method can include in step 260 injection molding the first and second pairs of end walls.

One or both of each pair of end walls can be identical or substantially similar to one or both of the other pairs of end walls, depending upon the desired form of the storage assemblies. The step 260 of injection molding the first and second pairs of end walls includes providing a mold of at least one of the end walls and injecting into the mold a material, which is typically a polymeric material, such as polyvinyl chlorides, polycarbonates, polyesters, chlorinated polyethylenes, acrylics, polystyrenes, acrylonitrite-butadiene-styrene copolymers, nylons and any combinations or variations thereof. The end walls can be formed from one or more components. In one embodiment, two molds are provided corresponding to the two end walls that are to be attached to either end of the shelf extrusion. Each mold includes the structure of a bracket formed therein, so that the bracket is integrally formed on the face of the end wall distal to the shelf extrusion. The end wall can be formed from a single mold and storage assemblies of varying length can include identical or substantially similar end walls.

Each of the methods of forming refrigerator storage assemblies described herein can include aligning a translucent, metal or polymeric wall section in a channel formed in the side wall of the shelf extrusion, in which the end walls of the storage assembly engage the sides of the wall section. Additionally, the methods including this step can include an additional step of disposing a cap over the wall section. The cap can be engaged by the end walls of the assembly. Each of the methods can include the step of embossing the shelf extrusion to provide on the storage assembly one or more designs and/or indicia, such as the stylistic designs and company logos.

Figure 4:
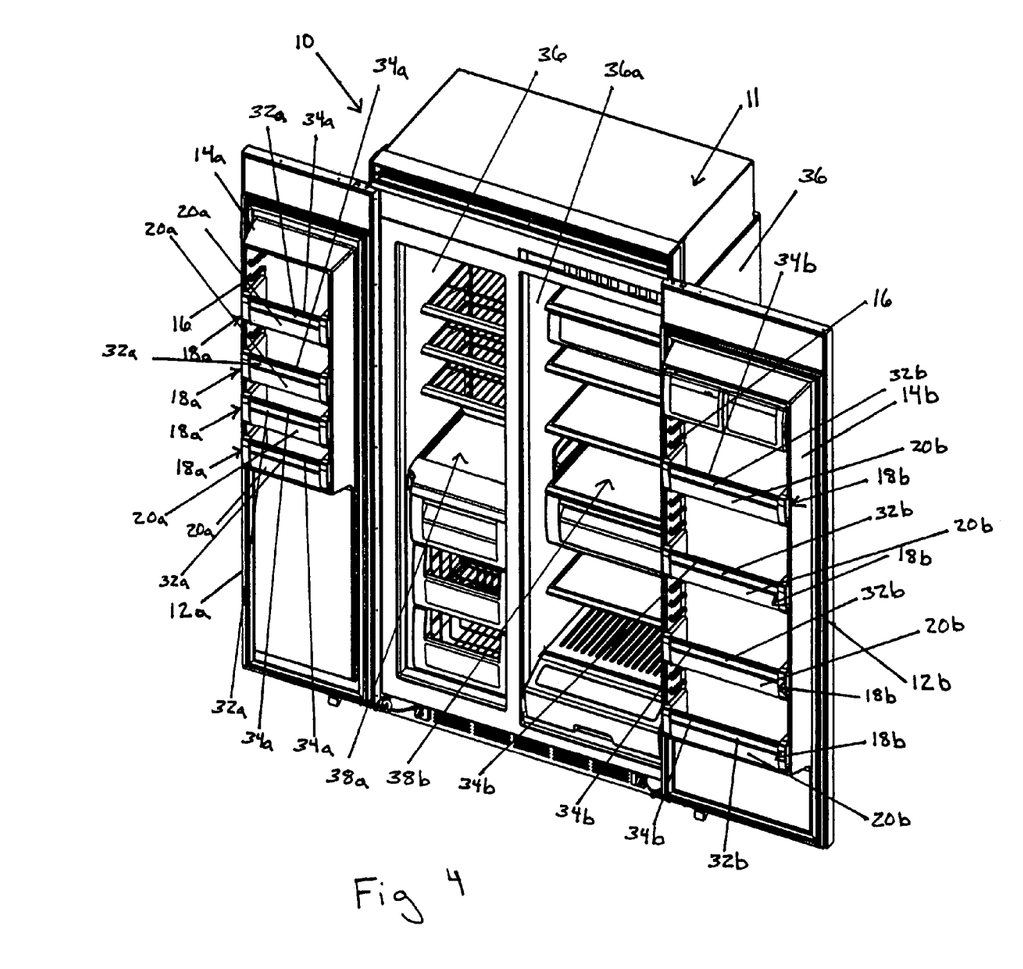
FIG. 4 is a perspective view of a refrigerator including storage assemblies formed by one of the methods of FIGS. 1-3.

FIG. 4 shows a refrigerator 10 including two sets of differently sized storage assemblies 18a and 18b that can be formed by the methods of the present invention. The refrigerator 10 includes a cabinet 11 formed of a plurality of insulated walls 36. A divider wall 36a is disposed in the interior of the cabinet 11, and cooperates with the other insulated walls 36 to form two separate compartments; one of which is a freezer compartment 38a and the other is a refrigeration compartment 38b in the embodiment shown in FIG. 4.

The refrigerator 10 also includes a first door 12a and a second door 12b, each of which are pivotally mounted to the cabinet 11 and cooperate with the plurality of insulated walls 36 to enclose the compartments 38a and 38b, respectively. The first door dike 14a is formed on the first door 12a. The first door dike 14a can be attached to or integrally formed with the first door 12a and includes one or more supports 16. As shown in FIG. 4, a plurality of supports 16 are vertically spaced along the side of the first door dike 14a and are aligned to cooperate with other supports 16 spaced along the opposite side of the first door dike 14a in order to support the shelf extrusions 18a. The supports 16 are shown as projections or ribs extending from the sides of the first door dike 14a.

A plurality of storage assemblies 18a are mounted on the first door 12a and supported by the first door dike 14a. The supports 16 engage brackets 27, as shown in FIGS. 4-5, formed on the side walls of each storage assembly 18a, which are described in greater detail below.

The second door 12b has mounted thereon a second door dike 14b, which includes a plurality of spaced supports 16 that support a plurality of second storage assemblies 18b. As shown in FIG. 4, the length of each of the first storage assemblies 18a is shorter than the length of each of the second storage assemblies 18b. Although, the first and second storage assemblies 18a and 18b can be otherwise identical, simply the difference in lengths of each would necessitate producing different tooling molds to form the shelf sections of the assemblies, if these shelf sections were fabricated by molding as is presently known. If the shelf extrusions 20a and 20b are formed by the methods of the present invention, however, there is no need for separate molds for each sized storage assembly, thus reducing cost and improving fabrication efficiency.

Figure 5:
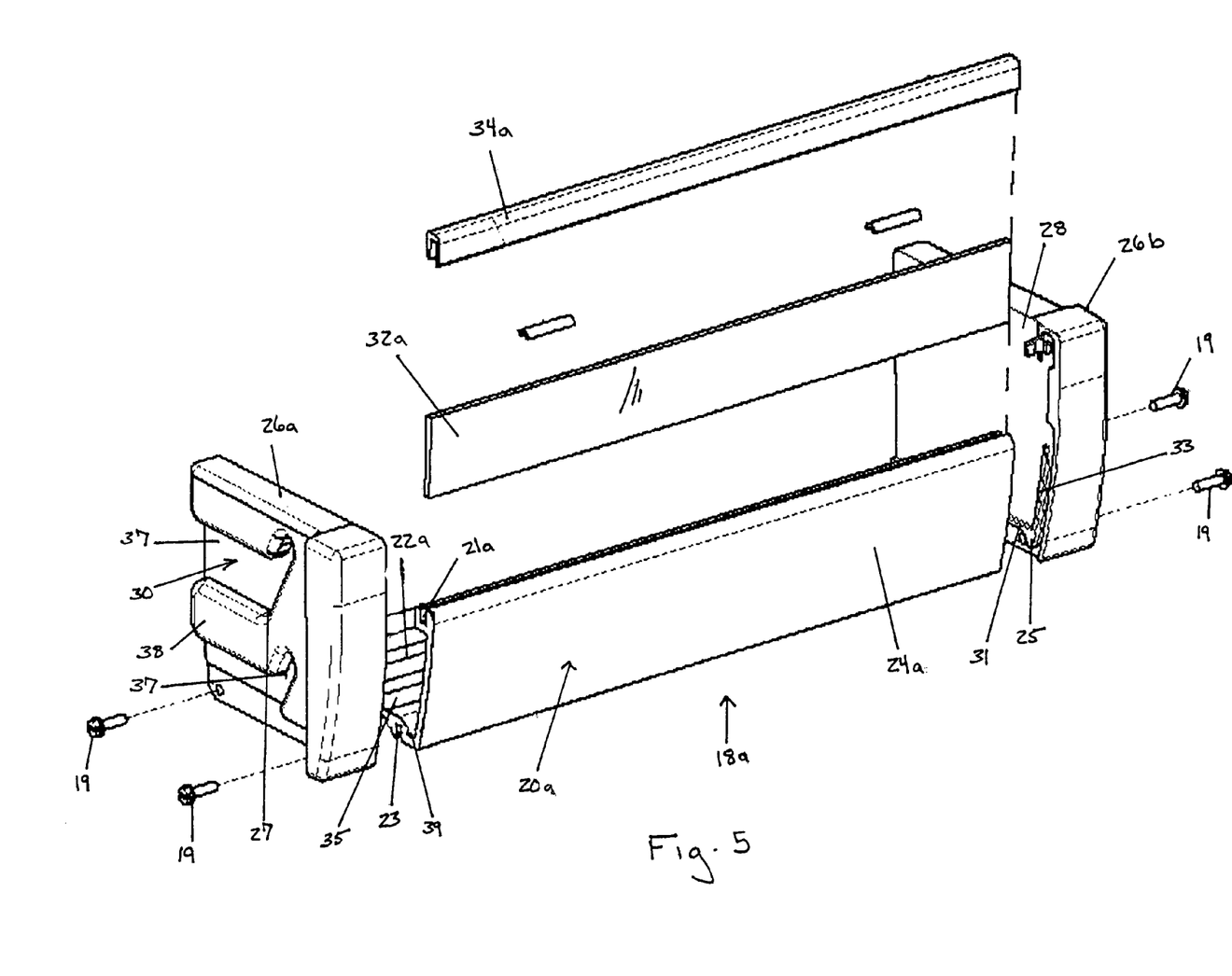
FIG. 5 is an exploded perspective view of a storage assembly, formed by a method of the present invention, disposed in the refrigerator shown in FIG. 4.

FIG. 5 shows one of the first storage assemblies 18a. The shelf extrusion 20a includes a first bottom wall 22a integrally formed with a first side wall 24a. The first side wall 24a includes a first channel 21a formed therein and extending along its length for receiving a first wall section 32a. The first wall section 32a can be metal, polymeric or glass. A first cap 34a fits over the edge of first wall section 32a. The first wall section 32a can be translucent so as to allow visual inspection of the contents of the first storage assembly 18a. Ridges 35 are formed in the top surface of the first bottom wall 22a, and the trough 39 formed at the juncture of the first side wall 24a and the first bottom wall 22a. Pair of end walls 26a and 26b are attached to opposite ends of the first shelf extrusion 20a. Each end wall 26a and 26b includes a proximal face 28 and a distal face 30. The proximal faces 28 are aligned toward the first shelf extrusion 20a, while the distal faces 30 are aligned away from the first shelf extrusion 20a. In the assembly shown in FIG. 5, the proximal faces 28 of the end walls 26a and 28b each include a protrusion 25 that engages the end of the shelf extrusion 20a. The protrusion 25 includes a first leg 31 and a second leg 33. The first leg 31 mates with the first bottom wall 22a of the shelf extrusion 20a. The second leg 33 of the protrusion 25 mates with the first side wall 24a. The first leg 31 of the brace 25 include a series of indentations therein that mate with the top surface of the first bottom wall 20a in an overlapping relationship. The protrusion 25 also functions as a self-locating feature for the shelf extrusion.

The distal faces 30 of the end walls 26a and 26b include brackets 27 that engage and mate with the supports 16 on the first rack 14a. The brackets 27 are shaped to define bracket channels 37 and protrusions 38 that allow for the first storage assembly 18a to be removed from one set of supports 16 and reinserted on another set of supports 16. Thus, the first storage assembly 18a is removably disposed on the first door 12a. The end walls 26a and 26b are attached to the first shelf extrusion 20a by fasteners 19 that are threaded through holes in the end walls 26a and 26b and through fastener channels 23 formed in the first shelf extrusion 20a. The fasteners 19 shown in the example in FIG. 5 are screws. Attaching the end walls to the shelf extrusion, however, can include fastening with other fasteners, such as, for example, pins, bolts, adhesives, and the like.

Figure 6:
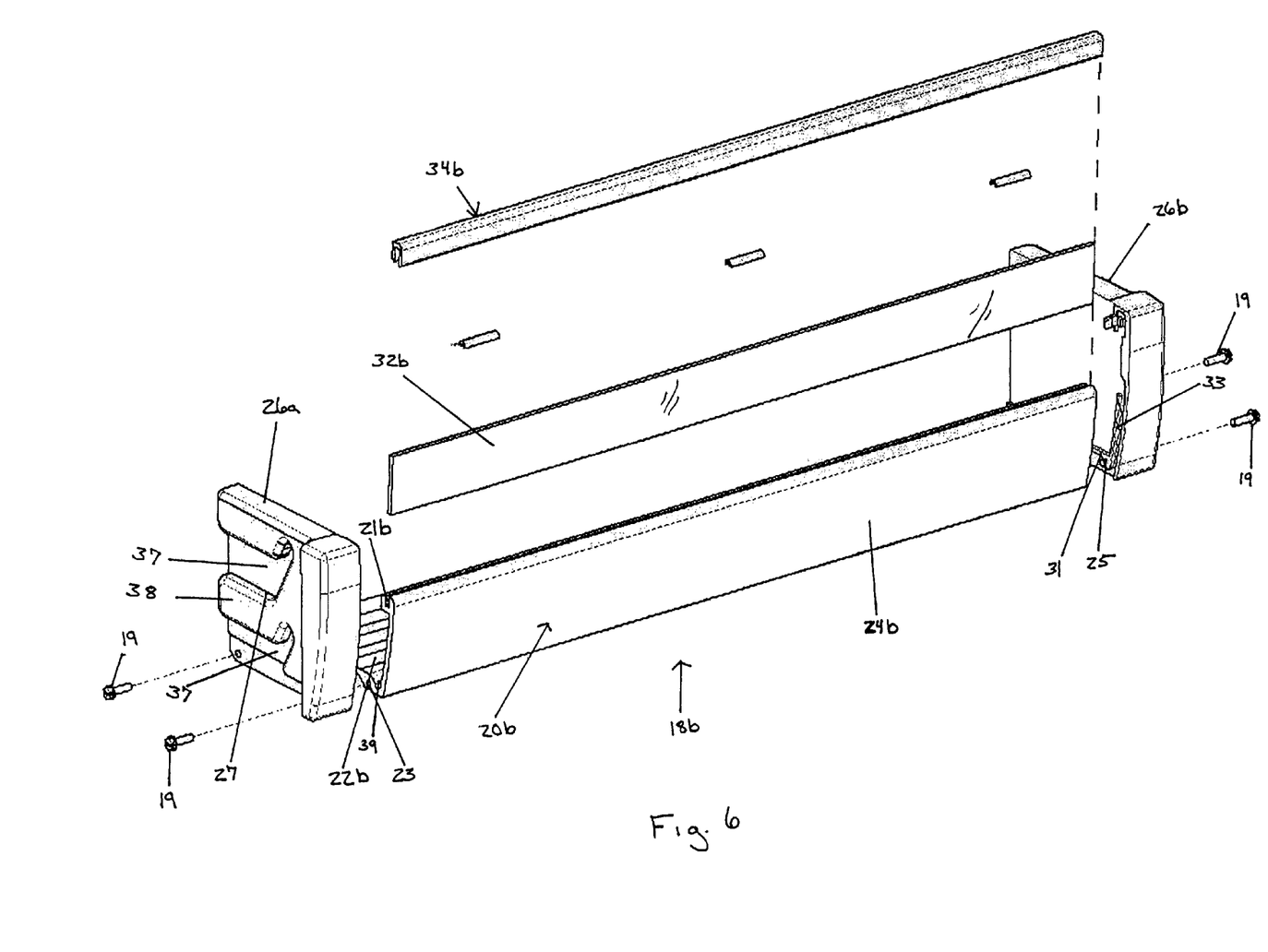
FIG. 6 is an exploded perspective view of another storage assembly disposed in the refrigerator shown in FIG. 4.

FIG. 6 shows one of the second storage assemblies 18b. The components of the second storage assembly 18b generally are the same as the components of the first storage assembly 18a, although the lengths of the second shelf extrusion 20b, the second wall section 32b and the second cap 34b are longer than the lengths of the first shelf extrusion 20a, the first wall section 32a and the first cap 34a of the first storage assembly 18a. The end walls 26a and 26b of the second storage assembly 18b are identical to the end walls of the first storage assembly 18a. The second bottom wall 22b, the second side wall 24b and the second channel 21b have the same cross-section along their entire lengths as the first bottom wall 22a, the first side wall 24a, and the first channel 21a of the first shelf extrusion 20a. Accordingly, FIGS. 5 and 6 illustrate how various sized storage assemblies having otherwise identical features can be fabricated according to the methods of the present invention.

Figure 7:
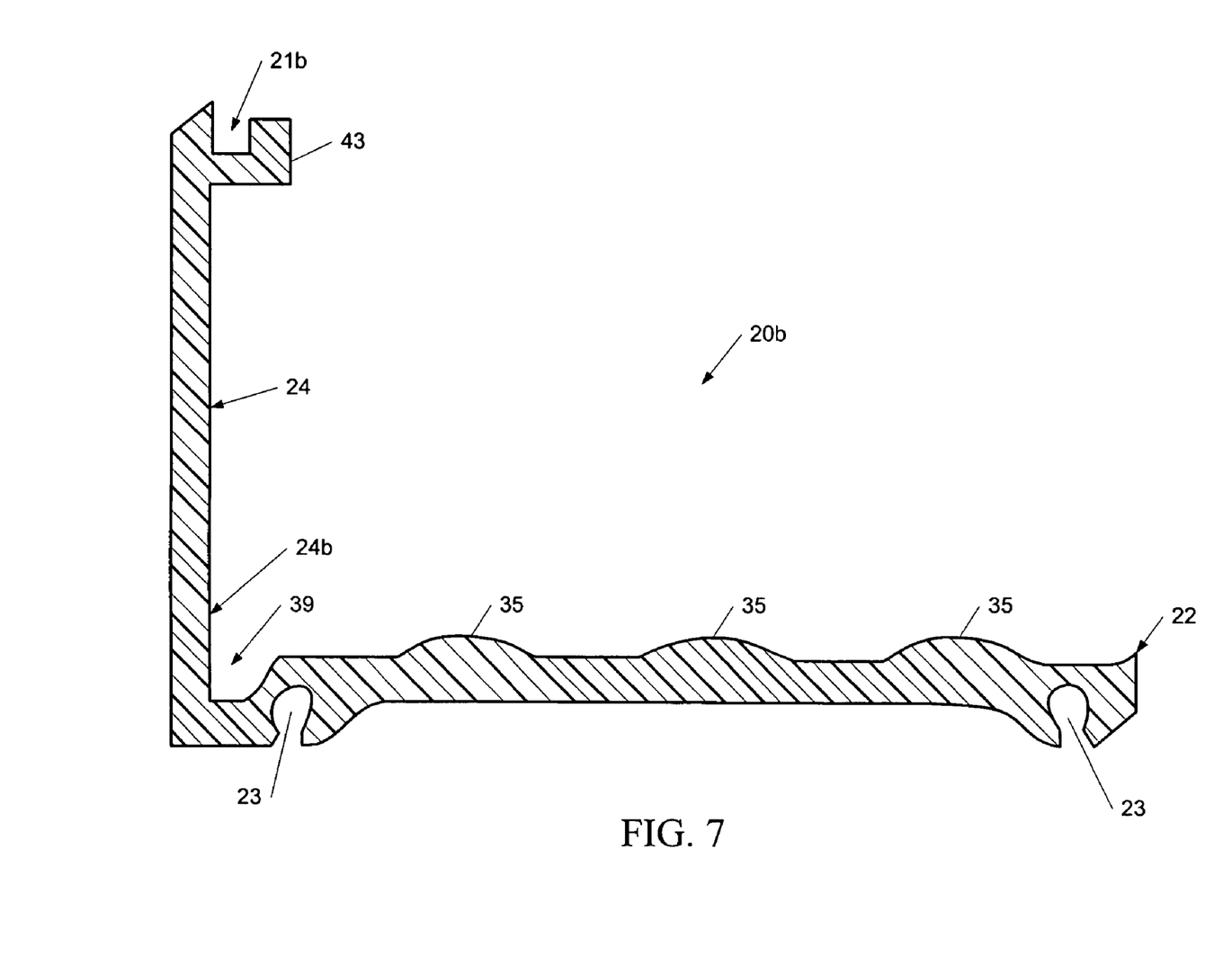
FIG. 7 is a cross-sectional view of the shelf extrusion of FIG. 6.

FIG. 7 shows the cross-section of second shelf extrusion 20*b*, which is identical to the cross-sections of the first shelf extrusion 20*a* and to the opening in the extrusion die used in the methods of forming the storage assemblies. The cross-section shown in FIG. 7 is uniform along the entire length of the second shelf extrusion 20*b*. The side wall 24*b* is integrally formed with the bottom wall 22*b* and connected at the lower end thereof to one lengthwise side of the bottom wall 22*b*. The channel 21*b* is formed at the top of the side wall 24*b* by an L-shaped flange 43. A wall section can be aligned in the channel 21*b*. The trough 39 is formed at the juncture of the bottom wall 22*b* and the side wall 24*b*. The bottom wall 22*b* includes a plurality of ridges 35 formed on the top face thereof. A pair of fastener channels 23 are spaced along the bottom of bottom wall 22*b* so as to receive fasteners 19, such as pins in one embodiment, which connect the shelf extrusion 20*b* to the end walls 26*a* and 26*b*. As described above, however, other types of fastening can be used.

The storage assemblies 20*a* and 20*b* are provided and described for purposes of illustrating at least two of the examples of refrigerator storage assemblies that can be formed by the methods of the present invention. The methods are not limited by these examples, however, and can be used to form storage assemblies with shelf extrusions of various designs. For example, the storage assemblies formed by the methods of the present invention can include only a bottom wall and no side walls, or can include two opposed side walls connected by a bottom wall to form a trough or similar chamber in which items can be stored on or in the storage assembly within a refrigerator. These and other designs are contemplated and encompassed by the methods set forth herein.

While the present invention has been described in detail herein in accord with certain embodiments, modifications can be made by those skilled in the art that fall within the scope of the invention.

What is claimed is:

1. A method of making a refrigerator storage assembly comprising:
   feeding a metal material to an extruder;
   extruding the metal material through a die of the extruder to form a first intermediate extrusion, wherein the die includes an aperture defining a first leg and a second leg;
   cutting the first intermediate extrusion to a predetermined length to form a first and a second end of a first shelf extrusion, the first shelf extrusion having a bottom floor integrally formed with a side wall, the side wall including a channel for receiving a first nonmetal translucent wall section;
   disposing the first nonmetal translucent wall section between the first shelf extrusion side wall channel and an end cap; and
   attaching a first nonmetal end wall to the first end of the first shelf extrusion, wherein the first nonmetal end wall engages the bottom floor and the side wall of the first shelf extrusion and engages the end cap at a distance spaced by the first translucent wall section,
   attaching a second nonmetal end wall to the second end of the first shelf extrusion, wherein the second nonmetal end wall engages the bottom floor and the side wall of the first shelf extrusion and engages the end cap at a distance spaced by the first translucent wall section, and
   wherein the first and second nonmetal end walls engage a support in a refrigerator.

2. The method of claim 1, further comprising aligning a wall section in a channel formed in the side wall of the first shelf extrusion and engaging ends of the wall section with the first pair of end walls.

3. The method of claim 2, further comprising disposing a cap over the wall section and engaging ends of the cap with the first pair of end walls.

4. The method of claim 1, further comprising injection molding each of the first pair of end walls.

5. The method of claim 1, wherein attaching the first pair of end walls to the ends of the first shelf extrusion includes engaging the first shelf extrusion and one of the first pair end walls with a fastener.

6. The method of claim 5, wherein the fastener is a screw threadably engaged with the first shelf extrusion and one of the first pair of end walls.

7. The method of claim 1, further comprising coating the first shelf extrusion.

8. The method of claim 7, wherein the step of coating comprises a step selected from painting and plating.

9. The method of claim 1 further comprising:
   forming the end cap by extruding the metal material through the die;
   cutting the end cap to a second predetermined length to form ends of a second shelf extrusion, wherein the predetermined length is unequal to the second predetermined length; and
   attaching the end walls to the ends of the second shelf extrusion.

10. The method of claim 9, further comprising coating the second shelf extrusion.

11. The method of claim 10, wherein the step of coating comprises a step selected from painting and plating.

12. The method of claim 1, further comprising:
   forming the end cap by extrusion;
   cutting the end cap to a second predetermined length, the second predetermined length being greater than the predetermined length resulting in the end cap extending further into each said end wall than the first intermediate extrusion.

13. The method of claim 1 wherein the first translucent wall section is captured between, but not received in, either of the end walls.

* * * * *